(12) United States Patent
Raman et al.

(10) Patent No.: US 7,135,429 B2
(45) Date of Patent: Nov. 14, 2006

(54) ATTRITION RESISTANT CARRIER PRODUCT

(75) Inventors: Narayan K. Raman, Monroeville, PA (US); Thomas G. Krivak, Harrison City, PA (US); Robert C. Dilmore, Jeannette, PA (US); Paul A. Beauregard, Greensburg, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 300 days.

(21) Appl. No.: 10/155,446

(22) Filed: May 24, 2002

(65) Prior Publication Data

US 2003/0219369 A1 Nov. 27, 2003

(51) Int. Cl.
- B01J 21/08 (2006.01)
- B01J 21/12 (2006.01)
- B01J 21/14 (2006.01)

(52) U.S. Cl. .................. 502/232; 502/233; 502/234; 502/235; 502/237; 502/238; 502/243; 502/263

(58) Field of Classification Search ............. 502/232, 502/233, 234, 235, 238, 243, 263, 237
See application file for complete search history.

(56) References Cited

U.S. PATENT DOCUMENTS

| | | | | |
|---|---|---|---|---|
| 2,657,149 A | 10/1953 | Iler | ................... | 106/308 |
| 2,940,830 A | 6/1960 | Thornhill | ................... | 23/182 |
| 3,296,151 A | 1/1967 | Heinze et al. | ................... | 252/448 |
| 3,313,737 A | 4/1967 | Brinsmead et al. | ................... | 252/309 |
| 3,425,958 A | 2/1969 | Gentles | ................... | 252/458 |
| 3,894,964 A | 7/1975 | Roebke et al. | ................... | 252/448 |
| 3,909,286 A * | 9/1975 | Fitton | ................... | 106/467 |
| 3,920,578 A | 11/1975 | Yates | ................... | 252/313 |
| 4,039,474 A * | 8/1977 | Feistel et al. | ................... | 502/8 |
| 4,070,286 A | 1/1978 | Iler et al. | ................... | 210/31 C |
| 4,495,167 A | 1/1985 | Nauroth et al. | ................... | 423/339 |
| 4,508,607 A | 4/1985 | Winyall | ................... | 204/180 P |
| 4,617,060 A | 10/1986 | Dreibelbis | ................... | 106/193 R |
| 4,617,294 A | 10/1986 | Krivak et al. | ................... | 614/52 |
| 4,677,084 A * | 6/1987 | Bergna | ................... | 502/8 |
| 4,681,750 A | 7/1987 | Johnson et al. | ................... | 423/339 |
| 4,717,561 A | 1/1988 | Krivak et al. | ................... | 425/335 |
| 4,783,435 A | 11/1988 | Dreibelbis | ................... | 502/214 |
| 4,937,394 A | 6/1990 | Dreibelbis | ................... | 568/896 |
| 4,975,405 A * | 12/1990 | Okamura et al. | ................... | 502/233 |
| 5,051,385 A * | 9/1991 | Wachter | ................... | 502/64 |
| 5,094,829 A | 3/1992 | Krivak et al. | ................... | 423/339 |
| 5,266,397 A * | 11/1993 | Ogawa et al. | ................... | 428/323 |
| 5,286,693 A | 2/1994 | Ino et al. | ................... | 502/68 |
| 5,330,943 A | 7/1994 | Shi et al. | ................... | 502/62 |
| 5,352,645 A * | 10/1994 | Schwartz | ................... | 502/262 |
| 5,426,082 A * | 6/1995 | Marsden | ................... | 502/235 |
| 5,472,922 A | 12/1995 | Degnan et al. | ................... | 502/60 |
| 5,695,730 A * | 12/1997 | Maejima et al. | ................... | 516/82 |
| 5,723,402 A * | 3/1998 | Pullukat et al. | ................... | 502/232 |
| 5,739,072 A | 4/1998 | Shi et al. | ................... | 502/72 |
| 5,888,467 A | 3/1999 | Swift et al. | ................... | 423/335 |
| 6,107,238 A | 8/2000 | Contractor et al. | ................... | 502/247 |
| 6,342,560 B1 | 1/2002 | Okel | ................... | 524/493 |
| 6,413,373 B1 * | 7/2002 | Matsuda et al. | ................... | 162/181.6 |

FOREIGN PATENT DOCUMENTS

| | | |
|---|---|---|
| DE | 29 07 942 | 9/1980 |
| GB | 343441 | 2/1931 |
| GB | 610 080 | 10/1948 |
| GB | 929212 | 6/1963 |
| GB | 1 501 445 | 2/1978 |
| WO | 97/45365 | 12/1997 |

OTHER PUBLICATIONS

U.S. Appl. No. 09/638,312, filed Aug. 11, 2002, Process for Producing Chemically Modified Fillers.
U.S. Appl. No. 09/636,310, filed Aug. 11, 2002, Chemically Treated Fillers and Polymeric Compositions Containiing Same.
U.S. Appl. No. 09/636,308, filed Aug. 11, 2002, Process for Producing Chemically Treated Fillers.
U.S. Appl. No. 09/636,309, filed Aug. 11, 2002, Hydrophobic Particulate Inorganic Oxides and Polymeric Compositions Containing Same.
U.S. Appl. No. 09/636,311, filed Aug. 11, 2002, Process for Producing Hydrophobic Particulate Inorganic Oxides.
U.S. Appl. No. 10/041,114, filed Aug. 11, 2002 (Cont. 09/636,309) Hydrophobic Particulate Inorganic Oxides and Polymeric Compositions Containing Same.

* cited by examiner

*Primary Examiner*—Cam N. Nguyen
(74) *Attorney, Agent, or Firm*—Deborah M. Altman; Carol A. Marmo

(57) ABSTRACT

The present invention is directed to an attrition resistant carrier product such as silica. Further, this invention is directed to the use of a binder to improve the attrition resistance or reduce the friability of a carrier product such as silica. In an embodiment, the median particle size is from 125 to 300 microns. Selection of the binder is such that the presence and/or addition of the binder does not result in substantial modification of the physical properties of the silica. Suitable binders include Group I and Group II silicates, Group I and Group II aluminates, and mixtures thereof, as identified by the Period Table of Elements.

41 Claims, No Drawings

ATTRITION RESISTANT CARRIER PRODUCT

The present invention is directed to an attrition resistant carrier product such as silica. Further, this invention is directed to the use of a binder to improve the attrition resistance or reduce the friability of a carrier product such as silica.

The use of silica having a larger particle size as carriers for aqueous and organic liquids is known in the art. Silica is capable of absorbing a substantial quantity of an aqueous or organic liquid while remaining free flowing. Various silica have varying carrying capacities for liquids. The carrying capacity may be regarded as approximately the maximum amount of liquid that may be absorbed by the silica such that the mixture retains its free flowing characteristic U.S. Pat. No. 4,677,084 discloses an attrition resistant catalyst, catalyst precursor and catalyst support particles, and a process for preparation which includes calcining spray dried particles.

It has been found that silica having the defined characteristics of the present invention provides performance advantages relative to attrition resistance and friability.

As used herein and in the claims, "silica" is intended to refer to any water-insoluble solid obtained by precipitation from a liquid, with or without preliminary or subsequent treatment, and essentially comprising a mixture of substances selected from the group consisting of silicic acids, silica and the silicates or any admixtures thereof, or any combination of such mixtures and admixtures with a wide variety of metallic salts; such as for example, silica and silicate.

As used herein, the term "friability" refers to the tendency for silica agglomerate to breakdown during packaging, transport and customer processing, thereby generating dust. It is desirable in various applications to use a silica that generates a minimal amount of dust. In general, the lower the friability of a silica, the lower the amount of dust generated. In an embodiment of the present invention, friability may be measured using a probe sonication test.

In accordance with the present invention, there is provided a silica having reduced friability. The silica of the present invention comprises a binder wherein the binder is selected such that the physical characteristics of the silica remain substantially unchanged. Said physical characteristics include BET surface area, CTAB specific surface area and oil absorption. In an embodiment, the BET surface area measured after the binder addition is within ten percent (10%) or less, or five percent (5%) or less, of the said value measured prior to addition of the binder. In an embodiment, the CTAB surface area measured after the binder addition is within ten percent (10%) or less, or five percent (5%) or less, of the said value measured prior to addition of the binder. In an embodiment, the oil absorption measured after the binder addition is within ten percent (10%) or less, or five percent (5%) or less, of the said value measured prior to addition of the binder. In another embodiment, at least two of the BET surface area, CTAB surface area and oil absorption values measured after the binder addition are within ten percent (10%) or less, or five percent (5%) or less, of the respective values measured prior to addition of the binder. In a further embodiment, the BET and CTAB surface areas, and oil absorption values measured after the binder addition are within ten percent (10%) or less, or five percent (5%) or less, of the respective values measured prior to addition of the binder.

Suitable binders for use in the present invention include Group I and Group II silicates, Group I and Group II aluminates and mixtures thereof, as identified in the Periodic Table of Elements. Thus, a binder for use in the present invention is selected from the group consisting of hydrogen silicate, lithium silicate, sodium silicate, potassium silicate, rubidium silicate, cesium silicate, francium silicate, beryllium silicate, magnesium silicate, calcium silicate, strontium silicate, barium silicate, radium silicate, hydrogen aluminate, lithium aluminate, sodium aluminate, potassium aluminate, rubidium aluminate, cesium aluminate, francium aluminate, beryllium aluminate, magnesium aluminate, calcium aluminate, strontium aluminate, barium aluminate, radium aluminate, and mixtures thereof.

All numbers or expressions, such as those expressing structural dimensions, pressures, temperatures, flow rates, etc., used in the specification, examples and claims are to be understood as modified in all instances by the term "about" unless otherwise indicated.

Silica is generally produced by combining an aqueous solution of a soluble metal silicate with an acid. The soluble metal silicate is typically an alkali metal silicate such as for example, sodium or potassium silicate. The acid may be selected from the group consisting of mineral acids, organic acids, carbon dioxide and mixtures thereof; such as for example, sulfuric acid, hydrochloric acid, and/or carbon dioxide. The slurry may be dried; or it may be filtered, washed with water to reduce the concentration of alkali metal salt by-product, filtered and reslurried. The reslurry process may include agitation of the filter cake alone or agitation accompanied by the addition of water. Conventional drying, filtering, washing and reslurrying techniques known in the art may be employed. Various silica and methods for preparation are described, for example, in U.S. Pat. Nos. 2,657,149; 2,940,830; 4,495,167; 4,617,294; 4,681,750; 4,717,561; and 5,094,829; and U.S. Patent Applications having U.S. Ser. Nos. 09/636,308; 09/636,309; 09/636,310; 09/636,311; 09/636,312; and 09/636,711; which are incorporated herein by reference.

In an embodiment, silica for use in the present invention is prepared by a process in which a first aqueous solution of alkali metal silicate is established in a precipitation vessel equipped with agitation means. The first aqueous solution of alkali metal silicate is prepared by adding an aqueous alkali metal silicate solution to a predetermined quantity of water. Herein, the total weight amount of alkali metal is reported as $M_2O$. In an embodiment, the $M_2O/SiO_2$ ratio is from 1:3.0 to 1:3.5. In another embodiment, the $M_2O/SiO_2$ ratio is 1:3.3. The amount of $SiO_2$ and $M_2O$ used in the process is typically selected relative to gelation and crystallization concerns.

Suitable alkali metal silicates for use in the present invention include for example, lithium silicate, sodium silicate, potassium silicate, and mixtures thereof.

The water is heated to a temperature of from 75 to 95° C. in an amount sufficient to establish the desired concentration, and the solution is agitated to assure efficient mixing of the alkali metal silicate added to the water. In an embodiment, the alkali metal oxide concentration of the first aqueous alkali metal silicate solution is from 2.0 to 7.5 gpl, or from 2.3 to 3.3 gpl.

The temperature to which the first alkali metal silicate solution is heated for the precipitation step should be sufficiently high to preclude gelation of the reaction mixture, and sufficiently low to avoid boiling of the reaction mixture and phase transition to crystallization when the process is conducted in a non-pressurized vessel. This temperature may depend upon the initial alkali metal oxide concentration. Typically, the temperature is from 60° C. to 100° C. In an embodiment, the solution has a temperature of from 75° C. to 95° C.

Additional alkali metal silicate and an acidifying agent is then added to the first aqueous alkali metal silicate solution contained in a precipitation vessel while agitating the liquid reaction medium. Addition of the alkali metal silicate and acidifying agent is typically done slowly and simultaneously. Agitation is maintained during addition of the alkali metal silicate and acidifying agent to the first aqueous solution so as to provide an adequate dispersion of the added reactants within the precipitation vessel. The degree of agitation should be sufficient to provide substantially complete dispersion of the additional alkali metal silcate and acidifying agent.

The additional alkali metal silicate and acidifying agent are added at a rate sufficient to maintain the alkali metal oxide concentration in the first aqueous solution at substantially the same level; i.e., at substantially its initial value. Thus, the amount of acidifying agent added to the vessel containing the first aqueous alkali metal silicate solution is slightly less than the stoichiometric amount required for the additional alkali metal silicate added to the precipitation vessel so as to compensate for the effect of dilution by the alkali metal silicate and acidifying agent added during the second step. The amount of additional alkali metal silicate added may vary depending on the alkali metal oxide concentration in the first aqueous solution. For example, when the initial $M_2O$ (i.e., alkali metal) concentration is from 2.0 to 7.5 gpl, the amount of alkali metal silicate added may vary from 10 to 20 times, or from 12 to 16 times, the amount present in the first aqueous solution.

The acidifying agent used in the present invention to neutralize the alkali metal silicate is typically carbonic acid or an inorganic mineral acid, e.g., hydrochloric acid or sulfuric acid. Different acids may be used in the various process steps. In an embodiment, the carbonic acid acidifying agent provided by the introduction of carbon dioxide into the alkali metal silicate aqueous solution. The acidifying agent is added to the slurry in an amount such that the resulting pH thereof is from 8 to 9, or 8.4 to 8.6. Suitable acidifying agents include any acids that are strong enough to neutralize the alkali metal silicate. Examples of such acids include sulfuric acid, hydrochloric acid, nitric acid, phosphoric acid, formic acid, acetic acid, and mixtures thereof. In an embodiment, sulfuric acid, hydrochloric acid, nitric acid or phosphoric acid is used. In another embodiment, sulfuric acid is used.

The additional alkali metal silicate is typically added gradually to the precipitation vessel over a period of from about 60 to 150 minutes, or about 90 minutes. The particular addition time may be dependent on the multiples of additional alkali metal silicate added. The rate of addition of the acidifying agent is controlled by monitoring the pH of the alkali metal silicate solution or slurry in the vessel. The pH may be measured using any convenient commercially available pH meter. During addition of the additional alkali metal silicate and acidifying agent, the temperature of the resulting slurry in the precipitation vessel is maintained at about the temperature of the first alkali metal silicate aqueous solution, although some slight cooling may occur. The additional alkali metal silicate added to the precipitation vessel typically has the same alkali metal cation as the cation of the starting alkali metal silicate solution, e.g., sodium.

After addition of the additional alkali metal silicate and acidifying agent to the precipitation vessel is completed, additional acidifying agent is added slowly, and typically at the same rate used during the preceding (second) process step to achieve or maintain a pH of the siliceous slurry of from 8 to 9, i.e., slightly alkaline, e.g., about 8.5. Thereupon, the slurry is agitated slowly and allowed to age for about 10 to 90 minutes at the then existing temperature of the liquid reaction medium. Aging temperatures may vary greatly. In an embodiment, the temperature is from about 80° C. to 95° C. Subsequent to the aging step, additional acidifying agent is added to the aged slurry until the pH thereof is acidic. In an embodiment, the pH is from 3.6 to 4.7. In another embodiment, the additional acidifying agent is added in an amount such that the pH of a weight percent slurry of the final recovered and dried silica product is about neutral. For example, has a pH of from 6.5 to 7.5, or 6.9 to 7.1.

The precipitated silica in the acidified slurry is then recovered, washed and dried. Recovery of the precipitated silica may be accomplished by any conventional liquid-solid separating means, e.g., drum filters, plate and frame filters, centrifuge, etc. The precipitated silica (e.g., filter cake) is washed with water or other suitable aqueous washing fluid until the residual alkali metal salt (e.g., sodium chloride and/or sodium sulfate) content of the silica is less than 2.5 weight percent, or from 0.5 to 1.5 weight percent. Silica prepared by the above-described method using sulfuric acid as the acidifying agent will typically have a sodium chloride content of less than about 0.10 weight percent, e.g., less than 0.07 weight percent; a sodium sulfate content of less than about 2.5 weight percent, or less than 2.0 weight percent; and a sodium oxide content less than about 1.5 weight percent, or not more than about 1.0 weight percent. The residual alkali metal salt content may be determined by x-ray fluorescence spectroscopy which is known in the art. The aforementioned values were determined using a Rigaku Model RIX 2000 x-ray fluorescence spectrometer.

The filter cake is then liquefied using water or another suitable aqueous fluid and sheared to produce a uniform and pumpable slurry.

In the present invention, a binder is added to the silica slurry. The binder is selected such that addition of the binder to the silica does not substantially modify the physical characteristics of the silica. Said physical characteristics include BET surface area, CTAB surface area and oil absorption. In an embodiment, the BET surface area measured after the binder addition is within ten percent (10%) or less, or five percent (5%) or less, of the said value measured prior to addition of the binder. In an embodiment, the CTAB surface area measured after the binder addition is within ten percent (10%) or less, or five percent (5%) or less, of the said value measured prior to addition of the binder. In an embodiment, the oil absorption measured after the binder addition is within ten percent (10%) or less, or five percent (5%) or less, of the said value measured prior to addition of the binder. In another embodiment, at least two of the BET surface area, CTAB surface area and oil absorption values measured after the binder addition are within ten percent (10%) or less, or five percent (5%) or less, of the respective values measured prior to addition of the binder. In a further embodiment, the BET and CTAB surface areas, and oil absorption values measured after the binder addition are within ten percent (10%) or less, or five percent (5%) or less, of the respective values measured prior to addition of the binder.

A binder for use in the present invention is selected from the group of soluble inorganic binders known in the art. The present invention excludes the use of organic binders known in the art. Suitable binders for use in the present invention include Group I and Group II silicates, Group I and Group II aluminates and mixtures thereof, as specified in the Periodic Table of Elements. Thus, a binder for use in the present invention is selected from the group consisting of hydrogen silicate, lithium silicate, sodium silicate, potassium silicate, rubidium silicate, cesium silicate, francium silicate, beryllium silicate, magnesium silicate, calcium silicate, strontium silicate, barium silicate, radium silicate, hydrogen aluminate, lithium aluminate, sodium aluminate, potassium aluminate, rubidium aluminate, cesium aluminate, francium aluminate, beryllium aluminate, magnesium aluminate, calcium aluminate, strontium aluminate, barium aluminate, radium aluminate, and mixtures thereof. In an embodiment of the present invention, sodium silicate is used as a binder.

The binder is added in an amount of at least 0.5 percent, or at least one percent (1%), or at least three percent (3%), and not more than five percent (5%), or not more than ten percent (10%), or not more than twenty percent (20%) by weight of dry silica in the slurry. In the present invention, the use of a binder in an amount greater than five percent (5%) or greater than ten percent (10%) by weight of dry silica in the slurry may produce a silica that is not as commercially desirable. The binder is added in a manner such that gelation of the slurry is minimized or prevented. The binder is added in a relatively short period of time. An acid is added to neutralize the slurry. Suitable acids include any acids known in the art to reduce the pH of the slurry to a value within the range of from 5.5 to 7. For example, concentrated sulfuric acid (e.g., greater than 90%) may be used to neutralize the slurry in the present invention. The sequence of addition of the binder and the acid is not critical. In an embodiment, the binder and acid are simultaneously added to the slurry.

The slurry is then dried by a suitable drying means. The time period from initiation of the binder addition in the slurry to the production of a dried silica particle is such that precipitation of silicate out of solution is minimized or prevented. In the present invention, spray drying is employed and the period of time from initiation of binder addition to the production of a spray dried particle is sixty (60) minutes or less, or thirty (30) minutes or less.

In an embodiment, wherein neutralization of the silica slurry by acid addition is not desired, the binder of the present invention may be added during the spray drying process.

The dried silica may be used as recovered from the drying step if the particles are sufficiently finely-divided, such as the product recovered from a spray dryer. If, however, the drying step produces large, hard agglomerates or cemented particles, the dried product may be subjected to a milling or grinding step to produce a more finely-divided product having the appropriate particle size.

Milling techniques are known in the art and may be exemplified by grinding and pulverizing. In an embodiment, a wet milling process may be used prior to the addition of a binder and prior to the drying step. Examples of suitable wet mills include an APV Homogenizer and a Kady Mill.

In the present invention, the silica produced has a BET-nitrogen (5-point) surface area of from 100 to 300 m$^2$/g. The surface area of silica is determined by the method of Brunauer, Emmett and Teller, J. Am. Chem. Soc., 60, 309 (1938). This method, which is often referred to as the BET method, measures the absolute surface area of the material by measuring the amount of gas adsorbed under special conditions of low temperature and pressure. The BET surface areas reported herein were obtained using nitrogen as the gas adsorbed and liquid nitrogen temperatures (−196° C.) and at a relative pressure of from 0.05 to 0.3. The BET surface area was determined in accordance with ASTM D1993-91. As used herein, the BET surface area was determined by fitting five relative-pressure points from a nitrogen sorption isotherm measurement. The measurement was obtained using a Micromeritics TriStar 3000™ instrument. A FlowPrep-060™ station was used to provide heat and a continuous gas flow to prepare samples for analysis. Prior to nitrogen sorption, the silica samples were dried by heating to a temperature of 160° C. in flowing nitrogen (P5 grade) for a minimum of one (1) hour.

CTAB specific surface area is a measure of the external surface area of the silica. The French Standard Method (French Standard NFT 45-007, Primary Materials for the Rubber Industry: Precipitated Hydrated Silica, Section 5.12, Method A, pp. 64–71, November 1987) measures the external specific surface area by determining the quantity of CTAB (CetylTrimethylAmmonium Bromide) before and after adsorption at a pH of from 9.0 to 9.5, using a solution of the anionic surfactant Aerosol OT as the titrant. Unlike other CTAB methods (which use filtration to separate the silica), the French Standard Method uses centrifugation. The quantity of CTAB adsorbed for a given weight of silica and the space occupied by the CTAB molecule are used to calculate the external specific surface area of the silica. The external specific surface area value is as square meters per gram. The detailed procedure used to determine CTAB values herein is set forth in the Examples.

In the present invention, the silica has an oil absorption of from about 150 to about 300 milliliters of oil per one hundred grams of silica. It is believed that oil absorption is a measure of the openness of the silica structure and an indication of the susceptibility of the silica to undergo particle size reduction. As used herein, dibutyl phthalate (DBP) oil absorption of the silica is determined according to ASTM D 2414-93 using dibutyl phthalate as the absorbate.

Further, the silica used in the present invention has a water absorption value of from about 150 to about 300 milliliters per 100 grams of silica. The water absorption value represents the volume of water which is necessary to wet 100 grams of the silica. This value was obtained using the method described in ASTM D2414-65 or a similar method.

Silica prepared by the above-described process is a particulate solid material in the form of reinforced floes or aggregates. These reinforced flocs or aggregates are composed of solid spherical particles which are know as primary or ultimate particles. The primary or ultimate particles have a particle diameter of less than 0.1 micron as measured by a laser analyzer such as the aforementioned Beckman Coulter LS 230. Methods for characterizing primary particles have been described in prior art references (e.g., "The Chemistry of Silica," Ralph K. Iler, 1979 John Wiley & Sons, New York, Chapter 5). It is known in the art that primary or ultimate particles having a particle diameter of less than 0.1 micron show a tendency to group together and form covalent siloxane bonds between the particles, in addition to the siloxane bonds within the primary particles. These primary or ultimate particles collect and group together to form reinforced covalently bonded structures referred to as aggregates. In the silica of the present invention, the aggregates have a particle diameter of from 0.1 to 1 micron as measured by a laser analyzer such as the aforementioned Beckman Coulter LS 230. The aggregates collect and group together to form a loose agglomerate structure having an open porosity. In the present invention, the agglomerate of the dried silica has a median particle diameter of 300 microns or less, or from 125 microns to 300 microns. The median particle diameter may be measured using a laser particle size analyzer which is known in the art. The aforementioned diameter values were determined using the Beckman Coulter LS 230 analyzer.

In the present process, the valleys and gaps (i.e., the interstices between the aggregates in an agglomerate) are filled with binder. It is believed that the binder is effective to reinforce the bonds between the aggregates which form the agglomerate. Further, it is believed that an agglomerate reinforced with a binder is more resistant (i.e., resists being broken down into smaller aggregate structures thereby generating dust) to mechanical forces applied to it during preparation of a carrier product than an agglomerate which is not reinforced with a binder.

The present invention is more particularly described in the following examples which are intended as illustrative only since numerous modifications and variations therein will be apparent to those skilled in the art.

EXAMPLES

As used in the present specification and claims, the CTAB surface area of the amorphous precipitated silica is the CTAB surface area determined in accordance the following procedure: Using an analytical balance, 11.0 grams (g) of cetyltrimethylammonium bromide, also known as CTAB and as hexadecyltrimethylammonium bromide [CAS 57-09-0], was weighed to the nearest one-tenth milligram and the weight expressed in grams, C, was recorded. The weighed CTAB was dissolved in distilled water and diluted with distilled water to 2 liters in a volumetric flask to form a standard CTAB solution was stored in the dark for at least 12 days before use. Using an analytical balance, 3.70 grams of Aerosols® OT, sodium di(2-ethylhexyl) sulfosuccinate, [CAS 577-11-7] was weighed. The weighed Aerosol® OT was dissolved in distilled water and diluted with distilled water to 2 liters in a volumetric flask to form a standard Aerosol® OT solution which was stored in the dark for at least 12 days before use. The useful storage lives of the standard CTAB solution and the standard Aerosol® OT solution are two months after the 12 day storage period. Using a pipet, 10.0 milliliters (mL) of the CTAB standard solution was transferred to a 250 mL Erlenmeyer flask containing a stirring bar. Next, 30 mL chloroform, 50 mL distilled water, 15 drops of 0.02% bromophenol blue aqueous indicator solution, and one drop of 1N aqueous NaOH solution were added to the flask. With vigorous stirring but minimal splashing, the contents of the Erlenmeyer flask were titrated with the standard Aerosol® OT solution from a 50 mL buret. The titration was begun at a rapid drop rate (the stopcock was never wide open) down to about 25 to 30 mL and then more slowly, dropwise, to the end point which occurred at about 37.5 mL. The approach to the end point was characterized first by a milky blue color throughout. Then, as the end point was more closely approached, the bottom chloroform layer became a more intense blue and the top aqueous layer took on a lilac or purple hue. Immediately before the end point, the vigorously stirred mixture became visibly clearer (i.e., less "milky"), and the bottom layer was seen as a very intense blue.

Using a wash bottle, the inside of the flask was washed down with no more than 25 mL of distilled water. The stirrer speed was increased to resume vigorous mixing for efficient contacting of the two liquid phases. At least 10 seconds were allowed to elapse after each dropwise addition of titrant immediately prior to the endpoint. Stirring was stopped frequently to allow the phases to separate so that the analyst could observe these color changes and then vigorous stirring was resumed. At the end point, the bottom phase lost all color and displayed a colorless or milky white appearance while the top phase was intensely purple. The titrated volume was recorded to the nearest 0.01 mL. The titration of the standard CTAB solution was performed at least two times (the titrant volume must agree within 0.05 mL) and the average volume of standard Aerosol® OT solution used per titration, $V_1$, was recorded.

A 200 ml wide mouth glass bottle was tared and approximately 0.500 gram of silica sample (in the as-received state, not dried) was placed in the bottle and weighed to the nearest 0.1 mg. This silica sample weight, S, was recorded. One hundred milliliters of the standard CTAB solution was pipetted into the bottle by using a 50 mL pipet, filling and delivering twice; and a stirring bar was carefully added. The mouth of the bottle was covered with aluminum foil, and the contents were stirred gently for 15 minutes without pH adjustment. Using a pH electrode, the pH was adjusted to between 9.0 and 9.5 using 1N aqueous NaOH added dropwise. When the pH had been stabilized between 9.0 and 9.5, the mouth of the bottle was covered again with aluminum foil or equivalent to retard evaporation loss. The mixture was stirred gently for one hour at pH 9.0 to 9.5. The silica-liquid mixture was transferred to centrifuge tubes, and the mixture was centrifuged for 30 minutes to produce a clear centrifugate. Clear centrifugate was carefully withdrawn using a dropping pipet and transferred to a small, dry glass bottle. Using a pipet, 10.0 mL of the centrifugate was transferred into a 250 mL Erlenmeyer flask containing a stirring bar. Next, 30 mL chloroform, 50 mL distilled water, and 15 drops of 0.02% bromophenol blue aqueous indicator solution were added to the flask. The contents of the Erlenmeyer flask were titrated with the standard Aerosol® OT solution from a 50 mL buret using the same procedure and to the same endpoint used in titrating the standard CTAB solution. The volume of standard Aerosol® OT solution used, $V_2$, was recorded to the nearest 0.01 mL.

A small glass bottle and cap were heated for at least 30 minutes at 105° C. in a vacuum oven. The bottle and cap were then cooled in a desiccator. The bottle and cap were weighed to the nearest 0.1 milligram (mg), as used herein is the tare weight. Approximately one gram of silica sample was added to the bottle, the cap was placed on the bottle, and their combined weight was recorded to the nearest 0.1 mg. The cap was removed and the sample-containing bottle and cap were heated for 30 minutes at 105° C. in a vacuum oven. After introducing vacuum, heating was continued for an additional 30 minutes. The bottle and cap were then cooled in a desiccator. The weight of the bottle containing the sample was recorded to the nearest 0.1 mg. The tare weight was subtracted from the weight in grams of the silica before heating, A, and the weight in grams of the silica after heating, B.

The CTAB surface area (dry basis), $A_{CTAB}$, expressed in $m^2/g$, is calculated according to the formula:

$$A_{CTAB} = \frac{(V_1 - V_2)(C)(A)(28.92)}{(V_1)(S)(B)}$$

Examples 1, 2 and 3

A 200-gallon reactor fitted with two agitators was charged with 110 gallon of water. With the larger low speed agitator running at 250 revolutions per minute, the reactor was heated to a temperature of 85.6° C. Over a period of 7 minutes, 15.3 liters of commercial grade 70 g/l $Na_2O$ sodium silicate having an $Na_2O:SiO_2$ mole ratio of 1:3.3 was introduced. As aforementioned, herein the total weight amount of sodium is reported as $Na_2O$. The $Na_2O$ concentration in the heel was 2.5 g/l. With the smaller high speed agitator running at 2000 rpm, 200 liters of additional sodium silicate and 12 liters of concentrated sulfuric acid (>90%) was introduced simultaneously over a period of 90 minutes. The acid flow was adjusted to maintain the $Na_2O$ concentration at 2.5 g/l. After 90 minutes, additional acid was added to lower the pH to 8.5 and the slurry was then aged for 15 minutes. Following the aging period, acid addition was resumed to further lower the pH of the slurry to 3.9.

The resultant silica was filtered using a filter press and washed to a $Na_2SO_4$ content of 0.6% by weight. The resultant filter cake had a solids content of 17–18% by weight as measured by an O'Haus Moisture Balance. The cake was liquefied using water and sheared to produce a pumpable slurry. The solids concentration of the liquefied cake was measured as 12–15% by weight. A 15 liter sample of the liquefied filter cake was treated with a commercial grade sodium silicate solution (70 g/l $Na_2O$, having a $Na_2O$:$SiO_2$ mole ratio of from 1:3 to 1:3.5) as a binder in the amount of 1 to 3% by weight of dry silica in the slurry over a time period of 1 minute. The slurry was then neutralized with concentrated sulfuric acid (>90%) to reduce the pH to within the range of 6 to 6.5. The slurry was spray dried using the nozzle drying technique. The total time duration for the binder addition, acid neutralization step and spray drying was about 30 minutes.

One silica sample was prepared as described above and dried without binder treatment (Example 1). The silica in Example 1 had a median particle diameter of 177 microns as measured by the Beckman Coulter LS230 analyzer. The product had BET and CTAB surface areas of 150 and 116 $m^2$/g, respectively. The BET surface area was determined in accordance with ASTM D1993-91, and the CTAB surface area was determined in accordance with the aforementioned procedure. The silica in Example 1 had an oil absorption value of 228 ml/100 g which was determined in accordance with ASTM D1414-93.

The silica samples in Examples 2 and 3 were prepared and treated with 1 and 3% sodium silicate binder solution, respectively, using the aforementioned process. The median particle diameter of the silica in Examples 2 and 3 was 217 and 235 microns, respectively. The silica in Example 2 had BET and CTAB surface areas of 146 and 120 $m^2$/g, respectively, and an oil absorption value of 222 ml/100 g. The silica in Example 3 had BET and CTAB surface areas of 145 and 118 $m^2$/g, respectively, and an oil absorption value of 224 ml/100 g.

The following probe sonication procedure was developed and used for analyzing the friability of the silica product. A Fisher Scientific Sonic Dismembrator, Model 550 with a tapered horn and a flat tip (probe) was used to breakdown the agglomerates as function of sonicator amplitude and time. The resulting particle size was measured by a laser diffraction particle size instrument, LS 230 manufactured by Beckman Coulter, capable of measuring particle diameters as small as 0.04 micron. Approximately 2 g equivalent of silica, adjusted for moisture, was weighed into a 2 oz wide-mouth bottle containing a 1" stir bar, and 50 ml of water was then added to the bottle using a graduated cylinder. After stirring for one minute, the bottle was placed in an ice bath and the sonicator probe was inserted into the bottle such that there was a 4 cm probe immersion in the slurry. The sonication amplitude was adjusted for the desired intensity of 4, 6, and 8. The amplitude setting relates to the sonication power in watts and may be calculated following the procedure described in the report, "Method 3051: Microwave Assisted Acid Digestion of Sediments, Sludges, Soils and Oils," under Section 7: Calibration of Microwave Equipment, U.S. Environmental Protection Agency, SW-846, Version 2, December 1997.

The sonicator was run in the continuous mode in 60 second increments. An aliquot of sample was then withdrawn and the particle size was measured using the LS 230. The probe sonication study was carried out for the following preselected time periods: 60, 120, 180, 240, 330, and 420 seconds, respectively. A similar sonication time sequence was used at varying amplitude settings. It is considered that the larger the median particle diameter after sonication at a given amplitude setting and time duration, the less friable is the silica.

TABLE I

| Time, Sec | Amplitude #4, Example 1 | Amplitude #6, Example 1 | Amplitude #8, Example 1 | Amplitude #4, Example 2 | Amplitude #6, Example 2 | Amplitude #8, Example 2 | Amplitude #4, Example 3 | Amplitude #6, Example 3 | Amplitude #8, Example 3 |
|---|---|---|---|---|---|---|---|---|---|
| 0 | 177.7 | 177.7 | 177.7 | 217 | 217 | 217 | 235.00 | 235.00 | 235.00 |
| 60.00 | 24.76 | 11.93 | 3.87 | 24.75 | 15.64 | 9.38 | 32.72 | 20.71 | 15.47 |
| 120.00 | 15.57 | 3.35 | 0.31 | 18.91 | 9.42 | 3.84 | 24.74 | 15.73 | 9.84 |
| 180.00 | 9.83 | 0.32 | 0.22 | 15.70 | 6.03 | 0.48 | 20.71 | 12.44 | 6.34 |
| 240.00 | 4.74 | 0.27 | 0.19 | 12.52 | 4.31 | 0.35 | 19.02 | 9.61 | 4.68 |
| 330.00 | 0.717 | 0.187 | 0.19 | 9.76 | 0.44 | 0.28 | 16.40 | 7.25 | 0.59 |
| 420.00 | 0.367 | 0.18 | 0.18 | 7.48 | 0.39 | 0.28 | 13.79 | 5.88 | 0.40 |

The results in Table I demonstrate that binder treatment results in a less friable silica.

Examples 4 and 5

A 200 gram sample of each of the spray dried powders prepared in Examples 2 and 3 was calcined in a muffle furnace (Thermolyne Model AR2500) pre-heated to 400° C. After a time period of 30 minutes, the calcined powders were removed from the furnace and allowed to cool for one (1) hour under ambient conditions. Thus, Examples 4 and 5 correspond to the silica in Examples 2 and 3 calcined at 400° C., respectively. The median particle diameter of silica in Examples 4 and 5 were 232 and 271 microns, respectively. Example 4 silica had a BET and CTAB surface area of 134 and 118 $m^2$/g, and an oil absorption value of 226 ml/100 g, respectively and Example 3 silica had a BET and CTAB surface area of 133 and 116 $m^2$/g, and an oil absorption value of 213 ml/100 g, respectively. The results in Table II demonstrate that calcination of the silica further reduced its friability.

TABLE II

| Time, Sec | Amplitude #4, Example 4 | Amplitude #6, Example 4 | Amplitude #8, Example 4 | Amplitude #4, Example 5 | Amplitude #6, Example 5 | Amplitude #8, Example 5 |
|---|---|---|---|---|---|---|
| 0 | 232.1 | 232.1 | 232.1 | 271 | 271 | 271 |
| 60.00 | 35.35 | 19.80 | 14.98 | 43.26 | 25.2 | 18.33 |
| 120.00 | 26.86 | 15.22 | 8.97 | 31.80 | 18.7 | 12.5 |
| 180.00 | 22.11 | 11.09 | 5.59 | 26.00 | 16 | 9.4 |
| 240.00 | 19.27 | 8.76 | 3.56 | 23.40 | 12.66 | 7.3 |
| 330.00 | 16.40 | 6.48 | 0.44 | 19.94 | 10.4 | 5.4 |
| 420.00 | 14.47 | 4.96 | 0.34 | 17.68 | 8.4 | 4 |

Examples 6, 7, and 8

The silica sample used in Example 6 was prepared as described in Example 1, with the exception that the liquefied slurry was wet milled to reduce the median particle diameter to 0.21 microns. The silica samples of Examples 7 and 8 were prepared as described in Examples 2 and 3, with the exception that the liquefied slurry was wet milled to reduce the median particle diameter to 0.21 microns prior to treatment with the binder. The particle size distribution of the liquefied slurry before and after wet milling and shear is shown in Table III. The silica slurry in Example 6 was spray dried without binder treatment, whereas the silica samples in Examples 7 and 8 were treated with 1% and 3% by weight of sodium silicate binder, respectively.

The median particle diameter of the silica in Examples 6, 7, and 8 were 139.7, 130.4, and 135.3 microns, respectively. The silica in Example 6 had BET and CTAB surface areas of 157 and 124 $m^2/g$, respectively, and an oil absorption value of 184 ml/100 g. The 1% binder treated silica in Example 7 had BET and CTAB surface areas of 157 and 123 $m^2/g$. respectively, and an oil absorption value of 180 ml/100 g. The 3% binder treated silica in Example 8 had BET and CTAB surface areas of 152 and 125 $m^2/g$, respectively, and an oil absorption value of 186 ml/100 g.

TABLE III

| Volume, % | Liquefied Slurry, Examples 1, 2, 3 Particle Diameter, micron | Liquefied Slurry, Examples 6, 7, 8 Particle Diameter, micron |
|---|---|---|
| 10 | 10.91 | 0.083 |
| 25 | 18.15 | 0.12 |
| 50 | 30.21 | 0.209 |
| 75 | 47.81 | 0.396 |
| 90 | 70.21 | 1.505 |

The results in Table IV demonstrate that wet milled slurry in combination with binder treatment further reduced the friability compared to unmilled slurry in combination with binder treatment (Examples 2 and 3).

Example 9

A 200 gram sample of the spray dried powder prepared in Example 8 was calcined in the muffle furnace pre-heated to 400° C., as described in Examples 4 and 5. After a time period of 30 minutes, the calcined powders were removed from the furnace and allowed to cool for one (1) hour under ambient conditions. The median particle diameter of silica in Examples 9 was 157 microns. Example 9 silica had a BET and CTAB surface area of 139 and 121 $m^2/g$, and an oil absorption value of 177 ml/100 g, respectively. The results summarized in Table V demonstrate that calcinations of the silica further reduces friability.

TABLE V

| Time, Sec | Amplitude #4, Example 9 | Amplitude #6, Example 9 | Amplitude #8, Example 9 |
|---|---|---|---|
| 0 | 157 | 157 | 157 |
| 60.00 | 86.45 | 40.80 | 28.20 |
| 120.00 | 55.93 | 30.96 | 22.03 |
| 180.00 | 44.41 | 23.63 | 16.84 |
| 240.00 | 38.87 | 20.97 | 13.89 |
| 330.00 | 33.29 | 17.67 | 10.11 |
| 420.00 | 30.08 | 14.95 | 7.39 |

Examples 10 and 11

A 200-gallon reactor fitted with one large low speed agitator was charged with 114 gallons of water. With the larger low speed agitator running at 250 revolutions per

TABLE IV

| Time, Sec | Amplitude #4, Example 6 | Amplitude #6, Example 6 | Amplitude #8, Example 6 | Amplitude #4, Example 7 | Amplitude #6, Example 7 | Amplitude #8, Example 7 | Amplitude #4, Example 8 | Amplitude #6, Example 8 | Amplitude #8, Example 8 |
|---|---|---|---|---|---|---|---|---|---|
| 0 | 139.7 | 139.7 | 139.7 | 130.40 | 130.40 | 130.40 | 135.30 | 135.30 | 135.30 |
| 60.00 | 38.02 | 19.61 | 9.38 | 43.24 | 28.13 | 17.55 | 49.95 | 31.16 | 22.01 |
| 120.00 | 24.88 | 4.11 | 0.29 | 32.39 | 17.92 | 7.51 | 36.85 | 22.24 | 13.02 |
| 180.00 | 15.25 | 0.28 | 0.18 | 26.75 | 11.74 | 0.51 | 29.64 | 16.58 | 8.23 |
| 240.00 | 9.95 | 0.24 | 0.18 | 22.46 | 7.09 | 0.30 | 26.77 | 12.83 | 5.61 |
| 330.00 | 0.744 | 0.175 | 0.18 | 18.36 | 0.76 | 0.27 | 21.83 | 8.63 | 0.66 |
| 420.00 | 0.357 | 0.18 | 0.18 | 14.10 | 0.39 | 0.25 | 17.47 | 6.17 | 0.40 | minute, the reactor was heated to a precipitation temperature of 92° C. Over a period of 20 minutes, 72 liters of commercial grade 70 g/l $Na_2O$ sodium silicate having an $SiO_2$:$Na_2O$ mole ratio of 1:3.3 was introduced. The $Na_2O$ concentration in the heel was 11 g/l. The temperature of the reaction mixture was maintained at 92° C. Over a time period of 30 minutes, 27 liters of 5.29 Normality (N) sulfuric acid was introduced. The acid flow was adjusted to reduce the $Na_2O$ concentration of the reaction mixture to from 1.1 to 1.2 g/l. The resulting reaction mixture was aged for 10 minutes. Following the aging step and over a time period of 40 minutes, 79 liters of sodium silicate and 32 liters of 5.29 N sulfuric acid were introduced simultaneously. The acid flow was adjusted to maintain the Na2O concentration in the reaction mixture at from 1.1 to 1.2 g/l. After 40 minutes, additional acid was added to lower the pH to 8.5. The slurry was then aged for 10 minutes. Following the aging period, acid addition was resumed to further lower the pH of the slurry to 4.3.

The resultant silica was filtered using a filter press and washed to a $Na_2SO_4$ content of less than 0.6% by weight. The resultant filter cake had a solids content of from 16 to 17% by weight. The cake was liquefied using water and sheared to produce a pumpable slurry. The solids concentration of the liquefied cake was measured as from 12 to 15% by weight. A 15 liter sample of the liquefied filter cake was treated with a commercial grade sodium silicate solution (70 g/l $Na_2O$, having a $SiO_2/Na_2O$ mole ratio of from 1:3 to 1:3.5) as a binder in the amount of 3% by weight of dry silica in the slurry over a time period of 1 minute. The slurry was immediately neutralized with concentrated sulfuric acid (>90%) to lower the pH to within the range of 6 to 6.5. The slurry was then spray dried using the nozzle drying technique. The total time for the binder addition, acid neutralization step and spray drying was about 30 minutes. The silica in Example 10 was spray dried without binder treatment. The median particle diameter and oil absorption of the silica in Example 10 were 134.7 microns and 184 ml/100 g, respectively. The silica in Example 11 was treated with sodium silicate binder in the amount of 3% by weight of dry silica as described above. The median particle diameter and oil absorption of the Example 11 silica were 138.4 microns and 198 ml/100 g, respectively. Results in Table VI demonstrate that binder treatment reduces the friability of the silica.

TABLE VI

| Time, Sec | Amplitude #6, Example 10 | Amplitude #6, Example 11 |
|---|---|---|
| 0 | 134.7 | 138.4 |
| 60.00 | 24.73 | 49.14 |
| 120.00 | 13.56 | 20.69 |
| 180.00 | 8.28 | 15.51 |
| 240.00 | 5.39 | 13.32 |
| 330.00 | 0.351 | 10.88 |
| 420.00 | 0.256 | 10.29 |

The invention claimed is:

1. A treated silica formed by producing precipitated silica, combining said precipitated silica with liquid to form slurry and combining said slurry with soluble inorganic binder which is present in an amount of from 1% to 5% by weight of dry silica, wherein the presence of said binder does not substantially modify one or more physical properties selected from the group consisting of BET surface area, CTAB surface area and DBP oil absorption of the silica without said binder, and wherein said treated silica has a median particle diameter of from 125 to 300 microns.

2. The treated silica of claim 1 wherein said binder is present in an amount of from 1% to 3% by weight of dry silica.

3. The treated silica of claim 1 wherein one or more of said BET surface area, CTAB surface area and DBP oil absorption of the silica without said binder is modified by 10% or less in the presence of said binder.

4. The treated silica of claim 1 wherein one or more of said BET surface area, CTAB surface area and DBP oil absorption of the silica without said binder is modified by 5% or less in the presence of said binder.

5. The treated silica of claim 1 wherein said binder is selected from the group consisting of hydrogen silicate, lithium silicate, sodium silicate, potassium silicate, rubidium silicate, cesium silicate, francium silicate, beryllium silicate, magnesium silicate, calcium silicate, strontium silicate, barium silicate, radium silicate, hydrogen aluminate, lithium aluminate, sodium aluminate, potassium aluminate, rubidium aluminate, cesium aluminate, francium aluminate, beryllium aluminate, magnesium aluminate, calcium aluminate, strontium aluminate, barium aluminate, radium aluminate, and mixtures thereof.

6. The treated silica of claim 1 wherein said binder is selected from the group consisting of sodium silicate, potassium silicate, sodium aluminate and potassium aluminate.

7. The treated silica of claim 1 wherein said binder is sodium silicate.

8. The treated silica of claim 1 wherein said physical property is BET surface area.

9. The treated silica of claim 1 wherein said physical property is CTAB surface area.

10. The treated silica of claim 1 wherein said physical property is DBP oil absorption.

11. The treated silica of claim 1 wherein said physical property includes at least two selected from the group consisting of BET surface area, CTAB surface area and DBP oil absorption.

12. The treated silica of claim 1 wherein said BET surface area of the silica without said binder is modified by 10% or less in the presence of said binder.

13. The treated silica of claim 1 wherein said CTAB surface area of the silica without said binder is modified by 10% or less in the presence of said binder.

14. The treated silica of claim 1 wherein said DBP oil absorption of the silica without said binder is modified by 10% or less in the presence of said binder.

15. The treated silica of claim 1 wherein said BET surface area of the silica without said binder is modified by 5% or less in the presence of said binder.

16. The treated silica of claim 1 wherein said CTAB surface area of the silica without said binder is modified by 5% or less in the presence of said binder.

17. The treated silica of claim 1 wherein said DBP oil absorption of the silica without said binder is modified by 5% or less in the presence of said binder.

18. A process for preparing a treated silica comprising substantially recovering precipitated silica from liquid to produce recovered precipitated silica; combining said recovered precipitated silica with liquid to form silica slurry; combining said silica slurry with soluble inorganic binder which is present in an amount of form 1% to 5% by weight of dry silica wherein said binder does not substantially modify one or more physical properties selected from the group consisting of BET surface area, CTAB surface area and DBP oil absorption of the silica without said binder; and drying said silica slurry to produce said treated silica.

19. The process of claim 18 wherein the time period from initiation of said binder in said silica slurry to production of said dried treated silica is 60 minutes or less.

20. The process of claim 19 wherein the time period from initiation of said binder in said silica slurry to production of said dried treated silica is 30 minutes or less.

21. The process of claim 18 wherein said binder is selected from the group consisting of hydrogen silicate, lithium silicate, sodium silicate, potassium silicate, rubidium silicate, cesium silicate, francium silicate, beryllium silicate, magnesium silicate, calcium silicate, strontium silicate, barium silicate, radium silicate, hydrogen aluminate, lithium aluminate, sodium aluminate, potassium aluminate, rubidium aluminate, cesium aluminate, francium aluminate, beryllium aluminate, magnesium aluminate, calcium aluminate, strontium aluminate, barium aluminate, radium aluminate, and mixtures thereof.

22. The process of claim 18 wherein said binder is selected from the group consisting of sodium silicate, potassium silicate, sodium aluminate and potassium aluminate.

23. The process of claim 18 wherein said binder is sodium silicate.

24. The process of claim 18 wherein said physical property is BET surface area.

25. The process of claim 24 wherein said BET surface area of the silica without said binder is modified by 10% or less by said binder addition.

26. The process of claim 24 wherein said BET surface area of the silica without said binder is modified by 5% or less by said binder addition.

27. The process of claim 18 wherein said physical property is CTAB surface area.

28. The process of claim 27 wherein said CTAB surface area of the silica without said binder is modified by 10% or less by said binder addition.

29. The process of claim 27 wherein said CTAB surface area of the silica without said binder is modified by 5% or less by said binder addition.

30. The process of claim 18 wherein said physical property is DPB oil absorption.

31. The process of claim 30 wherein said DBP oil absorption of the silica without said binder is modified by 10% or less by said binder addition.

32. The process of claim 30 wherein said DBP oil absorption of the silica without said binder is modified by 5% or less by said binder addition.

33. The process of claim 18 wherein said physical properties is at least two selected from the group consisting of BET surface area, CTAB surface area and DBP oil absorption.

34. The process of claim 18 further comprising adding an acid to said silica slurry.

35. The process of claim 34 wherein said binder and said acid are simultaneously added to said silica slurry.

36. The process of claim 34 wherein said acid is sulfuric acid.

37. The process of claim 18 wherein said drying consists of spray drying.

38. A treated silica formed by producing precipitated silica, drying said precipitated silica and adding soluble inorganic binder to said precipitated silica during drying, said soluble inorganic binder being present in an amount of from 1% to 5% by weight of dry silica, wherein the presence of said binder does not substantially modify one or more physical properties selected from the group consisting of BET surface area, CTAB surface area and DBP oil absorption of the silica without said binder, and wherein said treated silica has a median particle diameter of from 125 to 300 microns.

39. The treated silica of claim 38 wherein said drying consists of spray drying.

40. A process for preparing treated silica comprising substantially recovering precipitated silica from liquid to produce recovered precipitated silica; drying said recovered precipitated silica; and adding soluble inorganic binder which is present in an amount of from 1% to 5% by weight of dry silica during drying, wherein said soluble inorganic binder does not substantially modify one or more physical properties selected from the group consisting of BET surface area, CTAB surface area and DBP oil absorption of the silica without said binder.

41. The process of claim 40 wherein said drying consists of spray drying.

* * * * *